(12) United States Patent
Lejeune

(10) Patent No.: US 10,338,694 B2
(45) Date of Patent: Jul. 2, 2019

(54) MULTIPLE FOCUS CONTROL

(75) Inventor: Stephane Lejeune, San Diego, CA (US)

(73) Assignee: Sony Corporation, Tokyo (JP)

( * ) Notice: Subject to any disclaimer, the term of this patent is extended or adjusted under 35 U.S.C. 154(b) by 985 days.

(21) Appl. No.: 12/009,818

(22) Filed: Jan. 22, 2008

(65) Prior Publication Data
US 2008/0178097 A1 Jul. 24, 2008

Related U.S. Application Data

(60) Provisional application No. 60/881,936, filed on Jan. 22, 2007.

(51) Int. Cl.
*G06F 3/0481* (2013.01)
*G06F 3/14* (2006.01)
(Continued)

(52) U.S. Cl.
CPC .............. *G06F 3/023* (2013.01); *G06F 9/451* (2018.02); *G06F 3/0481* (2013.01); *G06F 3/1423* (2013.01); *G06F 3/1438* (2013.01); *H04N 5/265* (2013.01); *H04N 5/4401* (2013.01); *H04N 5/45* (2013.01); *H04N 5/50* (2013.01); *H04N 7/063* (2013.01); *H04N 7/0806* (2013.01); *H04N 7/17318* (2013.01); *H04N 13/15* (2018.05)

(58) Field of Classification Search
CPC ........ H04N 5/265; H04N 5/4401; H04N 5/45; H04N 5/50; H04N 7/063; H04N 7/0806; H04N 7/17318; H04N 13/0037; H04N 13/15; G06F 3/0481; G06F 3/1423; G06F 3/1438; G06F 9/4443; G06F 9/451

USPC ..... 715/761, 767, 802; 345/1.1–1.3, 2.1–2.3, 345/3.1–3.4; 348/52, 11, 385.1, 388.1, 348/564, 584; 725/59, 100, 151–153
See application file for complete search history.

(56) References Cited

U.S. PATENT DOCUMENTS 5,721,820 A * 2/1998 Abali ................. H04L 45/00 370/235
5,734,380 A * 3/1998 Adams et al. ............ 715/804
(Continued)

OTHER PUBLICATIONS

Ramanathan et al., "A Home Network Controller for Providing Broadband Access to Residential Subscribers," IEEE Transactions on Consumer Electronics, vol. 41, No. 3, Aug. 1995, pp. 859-868.*
(Continued)

*Primary Examiner* — Eric J Bycer
(74) *Attorney, Agent, or Firm* — Haverstock & Owens LLP

(57) ABSTRACT

An embodiment of the present invention includes a technique to provide multiple focus controls. First and second focus managers manage first and second focus owners, respectively. The first and second focus owners correspond to components of media planes displayable on at least one of a plurality of output display devices. The first and second focus managers associate first and second key events generated by first and second input devices, respectively, to the respective first and second focus owners. A router has a routing table that stores information of association between first and second connections and the first and second focus managers, respectively. The router routes one of the first and second key events originating from the respective connection to a corresponding focus manager using the routing table.

33 Claims, 7 Drawing Sheets

(51) Int. Cl.
*G06F 9/451* (2018.01)
*H04N 5/265* (2006.01)
*H04N 5/44* (2011.01)
*H04N 5/45* (2011.01)
*H04N 5/50* (2006.01)
*H04N 7/06* (2006.01)
*H04N 7/08* (2006.01)
*H04N 7/173* (2011.01)
*H04N 13/15* (2018.01)
*G06F 3/023* (2006.01)

(56) References Cited

U.S. PATENT DOCUMENTS

| | | | | |
|---|---|---|---|---|
| 5,940,387 | A * | 8/1999 | Humpleman | H04L 12/2803 370/352 |
| 6,185,737 | B1 * | 2/2001 | Northcutt et al. | 725/110 |
| 6,574,234 | B1 * | 6/2003 | Myer | H04L 12/2832 370/438 |
| 6,678,004 | B1 * | 1/2004 | Schultheiss et al. | 348/552 |
| 6,957,275 | B1 * | 10/2005 | Sekiguchi | H04L 12/2803 370/401 |
| 7,383,341 | B1 * | 6/2008 | Saito et al. | 709/228 |
| 7,620,901 | B2 * | 11/2009 | Carpenter | G06F 3/048 715/754 |
| 7,623,140 | B1 * | 11/2009 | Yeh | G06T 15/503 345/522 |
| 7,660,255 | B2 * | 2/2010 | Berthaud | H04L 45/00 370/238 |
| 2003/0016679 | A1 * | 1/2003 | Adams | H04L 45/04 370/401 |
| 2003/0156218 | A1 * | 8/2003 | Laksono | 348/388.1 |
| 2004/0013137 | A1 * | 1/2004 | Lohr | H04J 3/14 370/539 |
| 2004/0109457 | A1 * | 6/2004 | Johnson | H04L 45/08 370/401 |
| 2007/0036164 | A1 * | 2/2007 | Goehler | H04L 12/2803 370/401 |
| 2007/0050717 | A1 * | 3/2007 | Eklund | G11B 27/034 715/731 |
| 2008/0106645 | A1 * | 5/2008 | Lee | H04N 5/44504 348/565 |

OTHER PUBLICATIONS

Kar, Mukta, "IEEE 1394—The Multimedia Bus of the Future," SPECS Technology (Part 1, Jul. 1998; Part 2, Oct. 1998), available at http://www.cablelabs.com/news/newsletter/SPECS/spectechjuly/tech.pgs/leadstory.html and http://www.cablelabs.com/news/newsletter/SPECS/spectechoct/tech.pgs/leadstory.html.*

Lea et al., "Networking Home Entertainment Devices with HAVi," Computer, Sep. 2000, pp. 35-43.*

Zahariadis et al., "Multimedia home networks: standards and interfaces," Computer Standards & Interfaces 24 (2002), pp. 425-435.*

O'Donnell, Bob, "HDMI: The Digital Display Link," Silicon Image, Dec. 2006.*

Ku, et al., "A Java-Based Home Network Middleware Architecture Supporting IEEE1394 and TCP/IP," IEEE Transactions on Consumer Electronics, vol. 48, No. 3, Aug. 2002, pp. 496-504.*

Shinder, Deb, "Understanding routing tables," retrieved on Jun. 13, 2016, from http://www.techrepublic.com/article/understanding-routing.tables, May 23, 2001, 10 pages.*

RFC793, 1981, 90 pages.*

Stevens, W. Richard, "TCP/IP Illustrated, vol. 1: The Protocols," 1994, 591 pages.*

* cited by examiner

MULTIPLE FOCUS CONTROL

RELATED APPLICATION

This application claims the benefit of the provisional application, titled "MULTIPLE FOCUS CONTROL", filed on Jan. 22, 2007, Ser. No. 60/881,936.

BACKGROUND

Field of the Invention

Embodiments of the invention relate to the field of audio/video network systems, and more specifically, to multiple focus environment.

Description of Related Art

Graphical User's Interface (GUI) provides a convenient method to allow users to interact with machines or computers. A GUI typically has graphical components with interface functionalities. These components may include windows, scroll bars, menus, buttons, icons, etc. A "key event" indicates that a keystroke occurred on an input device and needs to be delivered on a component of an application. In a focus based system all the key events that are not exclusively reserved by a single component are to be delivered to the focus owner. The focus owner is defined as the component of an application that will typically receive all these (non-exclusively reserved) key events. The focus manager is responsible for maintaining which component is identified as the focus owner and the transitions of focus to another component. In single focus environments at any given time, exactly one component owns focus.

In many applications, it is desirable to have multiple active focus owners simultaneously. Existing techniques are inadequate to provide this ability. To provide multiple focus owners capabilities, multiple separate single focus based devices have to be employed. For example, to provide two simultaneous modes of control for two television sets, two set-top boxes have to be employed, one for each television set. This method requires extra hardware, expensive, and lacks control flexibility.

BRIEF DESCRIPTION OF THE DRAWINGS

Embodiments of the invention may best be understood by referring to the following description and accompanying drawings that are used to illustrate embodiments of the invention. In the drawings.

DESCRIPTION

An embodiment of the present invention includes a technique to provide multiple focus control. First and second focus managers manage first and second focus owners, respectively. The first and second focus owners correspond to components of media planes displayable on at least one of a plurality of output display devices. The first and second focus managers associate first and second key events generated by first and second input devices, respectively, to the respective first and second focus owners. A router has a routing table that stores information of association between first and second connections and the first and second focus managers, respectively. The router routes one of the first and second key events originating from the respective connection to a corresponding focus manager using the routing table.

In the following description, numerous specific details are set forth. However, it is understood that embodiments of the invention may be practiced without these specific details. In other instances, well-known circuits, structures, and techniques have not been shown in order not to obscure the understanding of this description.

One embodiment of the invention may be described as a process which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a program, a procedure, a method of manufacturing or fabrication, etc.

Embodiments of the invention provide a technique to allow multiple components to receive different key input events simultaneously. By partitioning the key input focus, it may be possible to distribute it over more than one component. Components may retain focus on certain key inputs to interact with a user while other components may simultaneously do the same on the same key inputs originating from different devices.

Figure 1A:
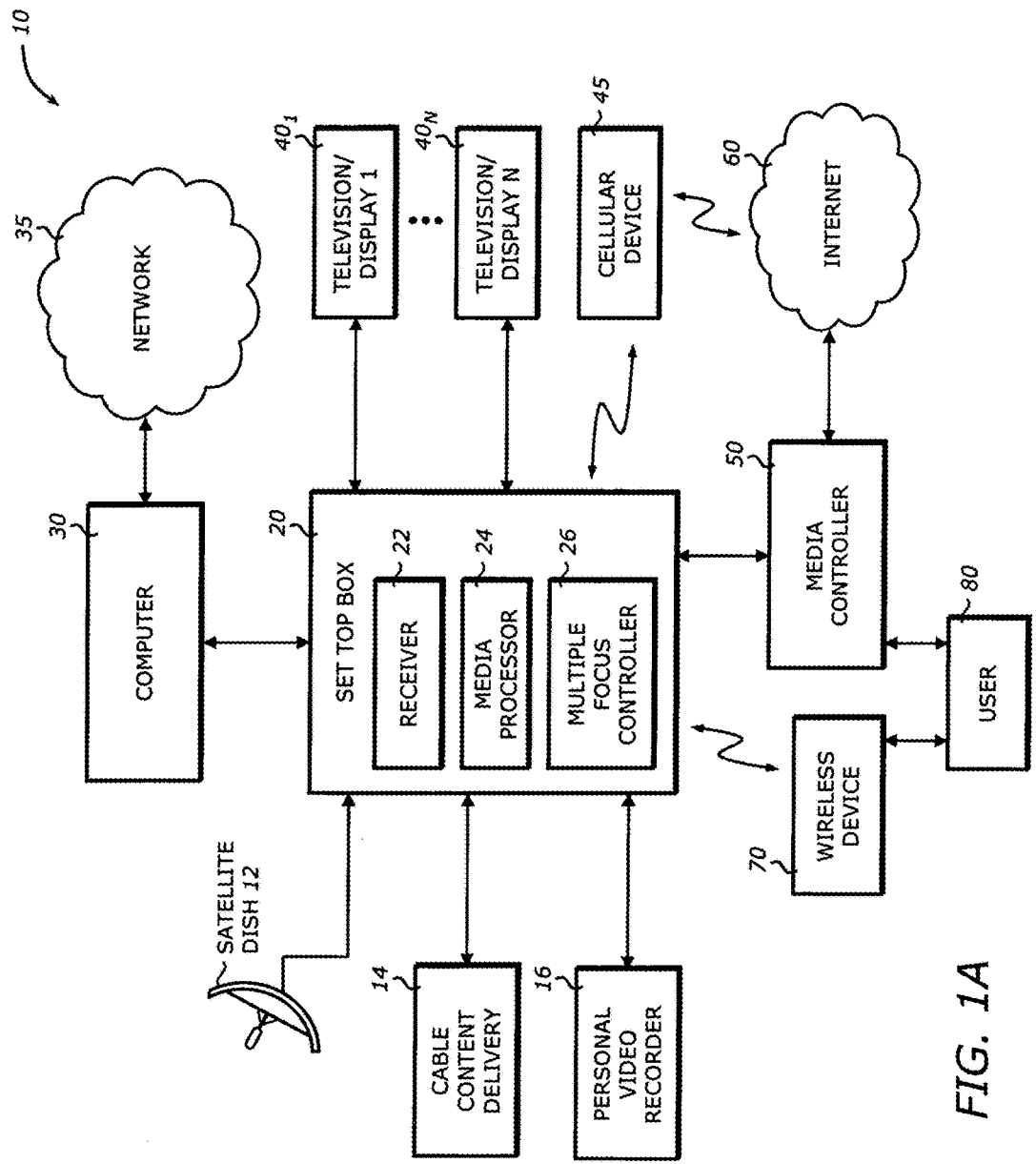
FIG. 1A is a diagram illustrating a system in which one embodiment of the invention can be practiced.

FIG. 1A is a diagram illustrating a system 10 in which one embodiment of the invention can be practiced. The system 10 includes a set-top box (STB) 20, a computer 30, N television/display units 40$_1$ to 40$_N$, a cellular device 45, a media controller 50, and a wireless device 70. Note that the system 10 may include more or less devices than the above.

The STB 20 is a device that receives media contents and transmits the media contents to output display devices such as the computer 30, the N television/display units 40$_1$ to 40$_N$. It may include a receiver 22, a media processor 24, and a multiple focus controller 26. The receiver 22 receives media contents delivered from a content source such as a satellite broadcast system provided by a satellite dish 12, a cable content delivery system 14, and a personal video recorder (PVR) 16. The media processor 24 is a processing subsystem that processes media data such as audio, video, or graphics. The media processor 24 may operate on multiple media planes such as video plane, graphics plane, background plane, etc. The media planes may contain components or objects that are associated with elements to be displayed on a display unit such as the computer 30, the N television/display units 40$_1$ to 40$_N$. The media processor 24 may provide control functions on the PVR 16 or other units such as record, play, stop, pause etc. The multiple focus controller 26 provides control over multiple focuses corresponding to components or objects in the various media planes. In addition, the multiple focus controller 26 allows tracking identical key events generated by input devices such as the wireless device 70 to different components on the media planes.

The computer 30 may be any computer such as a desktop, a notebook, a personal digital assistant (PDA) that may have connection to a network 35. The N television/display units 40₁ to 40_N may include any television set or display monitor that display media data processed by the STB 20. The display type may include any display type such as high definition TV (HDTV), cathode ray tube (CRT), flat panel display, plasma, liquid crystal display (LCD), etc. They may be located locally or remotely such as in various rooms of a residential unit. The STB 20 may also allow the PVR 16 to record contents displayed on any one of the N television/display units 40₁ to 40_N.

The cellular device 45 is any cellular unit that communicates with the STB 20 remotely and wirelessly such as a cell phone. It typically has a built-in display unit. The cellular device 45 may interact with the STB 20 to send commands for control functions or to receive media data. The media controller 50 is any unit that controls media devices such as a digital versatile disk (DVD) player, a game console, or an audio/video player. It may have an audio/video bus interface such as S-Link. It may have interface to the Internet 60. The STB 20 may also receive media contents delivered from the media controller 50 via the Internet 60. The wireless device 70 is any device that interacts with the STB 20 via a wireless connectivity such as radio frequency (RF), Bluetooth, optical (e.g., infrared), or sonic (e.g., ultrasound). It may be an input device such as a keyboard or a remote controller to allow a user to send key events or commands to the STB 20. The wireless device 70 and/or the media controller 50 may also interact with a user 80 to provide inputs to the multiple focus controller 26, or to provide display selection to the user 80.

Figure 1B:
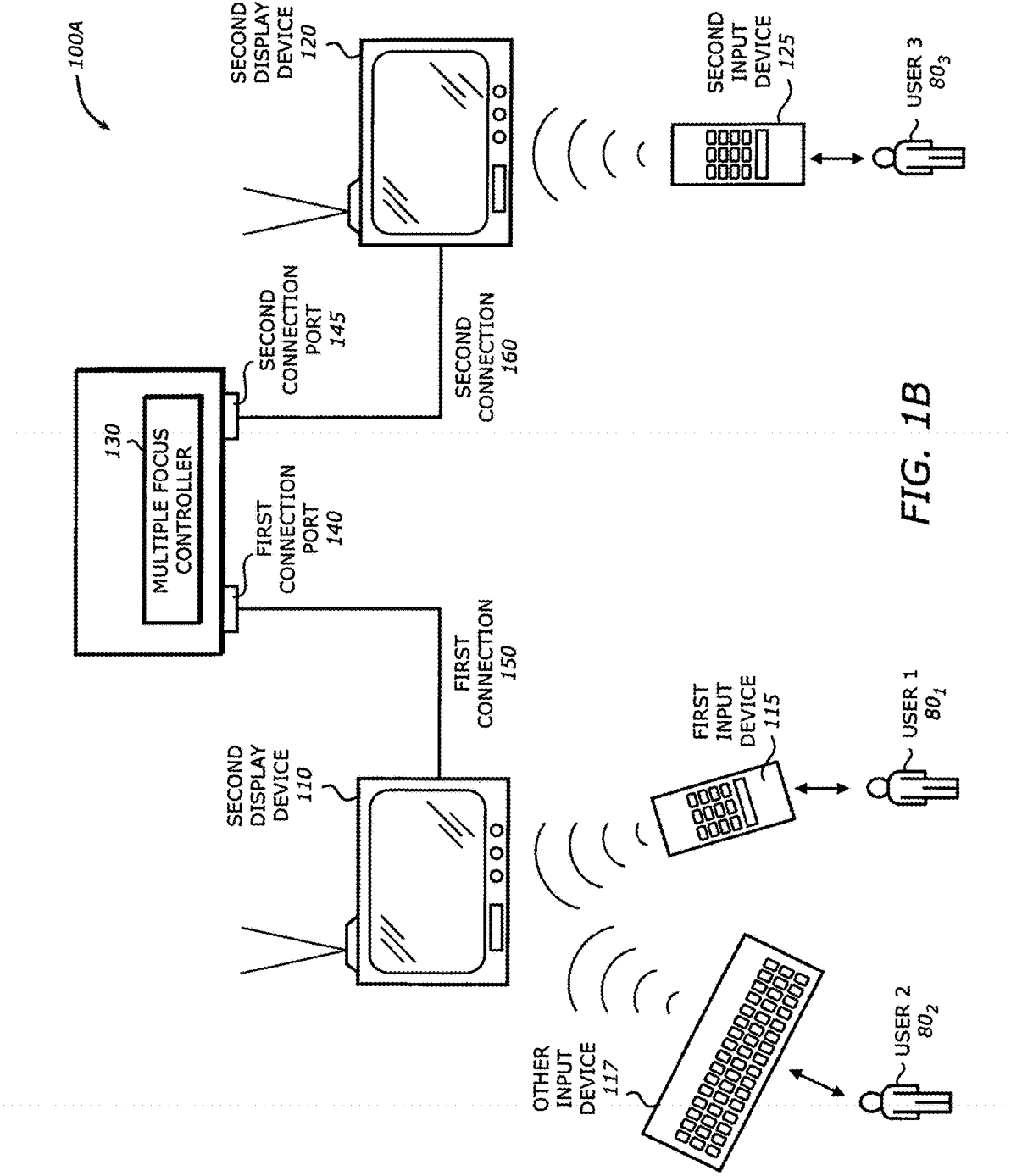
FIG. 1B is a diagram illustrating a system with wired connections in which one embodiment of the invention can be practiced.

FIG. 1B is a diagram illustrating a system 100A with cable connections in which one embodiment of the invention can be practiced. The system 100A includes a first display device 110, a second display device 120, a first input device 115, an other input device 117, a second input device 125, and a multiple focus controller 130. Note that the system 100A may include more or less elements than these elements.

The first and second display devices 110 and 120 may be any devices that display media data. They may be television (TV) set, or display monitors. The display type may include any display type such as high definition TV (HDTV), cathode ray tube (CRT), flat panel display, plasma, liquid crystal display (LCD), etc.

The first and second input devices 115 and 125 are any input devices that may generate key events to interact with their respective associated focus owners that happen to be displayed on the first and second display devices 110 and 120, respectively. Typically, the input devices 115 and 125 are remote control units used by one or more users 80_j to remotely interact through the interface rendered on the first and second display devices 110 and 120 using the multiple focus controller 130. They may have entry means such as buttons or keypad to allow the user to enter commands or to select an operation. They may also have a display to display response sent by the multiple focus controller 130. The user 80_j may select or enter a command to perform operations such as selecting an output display device to associate with the input device currently used, or selecting menu items or performing audio and/or video operations (e.g., play, pause, stop, fast review, fast forward). Each of the first and second input devices 115 and 125 may have a built-in wireless interface or transmitter to transmit key events in a wireless connectivity such as optical (e.g., infra-red), sonic (e.g., ultrasound), and electromagnetic (e.g., Bluetooth). Each of the first and second input devices 115 and 125 may have a built-in identification code, such as infra-red (IR) code, that may be embedded in the transmission of the key events so that the source of the key events may be extracted and identified. The third input device 117 may be any other input device (e.g., a keyboard) used by a user 803, which may be similar to the first and second input devices 115 and 125. This is to illustrate that multiple input devices may be associated with the same focus manager (as discussed below) simultaneously. All the input devices 115, 117, and 125 may also have a built-in wireless receiver to receive response from the display device or the multiple focus controller 130.

A key event is an event that indicates that a keystroke or an input activation has occurred on the input device. The key event is to be associated with the component of an application that owns the focus. For example, a key event may correspond to a keystroke on the "ok" button of a keypad on the input device while the focus is on a component representing a program event in an electronic program guide (EPG). This association allows the application to react accordingly.

The multiple focus controller 130 provides multiple focus control for the first and second display devices 110 and 120. It may be part of a set-top box, an integrated unit, a processing sub-system, or a network component. It provides user interactions via the input devices 115, 125, and 117 to perform operations according to the key events. A single multiple focus controller 130 may provide responses to key events for multiple display devices or multiple input devices.

In one embodiment, the multiple focus controller 130 is connected to the first display device 110 via a first connection 150 at the first connection port 140. It is connected to the second display device 120 via a second connection 160 at the second connection port 145. The connections 150 and 160 may be cable connections, wireless connections, or network (e.g., Internet protocol) connections. In one embodiment, the connections 150 and 160 are high definition multimedia interface (HDMI) connections and the first and second connection ports 140 and 145 are compatible with HDMI.

Figure 1C:
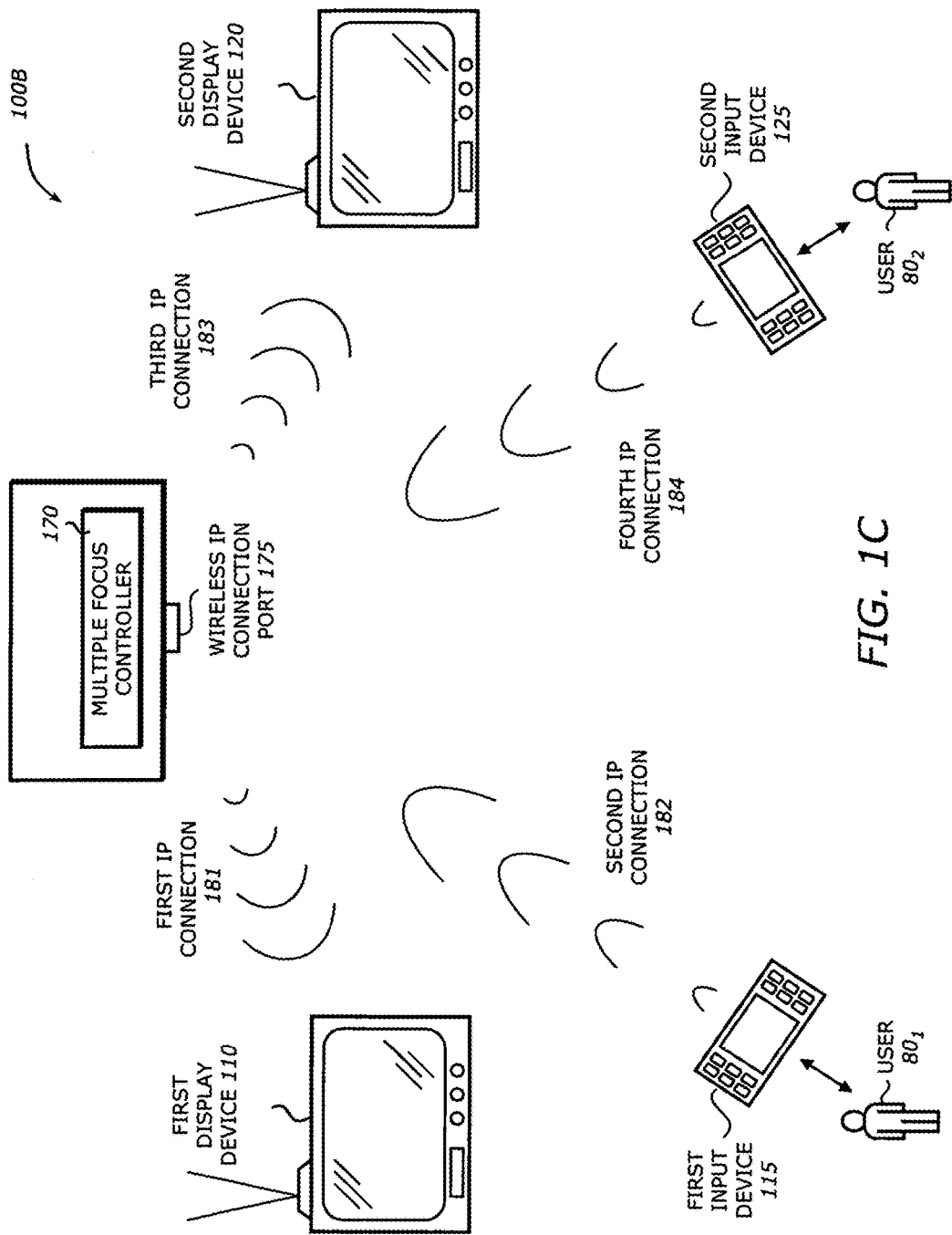
FIG. 1C is a diagram illustrating a system with wireless Internet Protocol connections in which one embodiment of the invention can be practiced.

FIG. 1C is a diagram illustrating a system 100B with wireless IP connections in which one embodiment of the invention can be practiced. The system 100B includes the first display device 110, the second display device 120, the first input device 115, the second input device 125, and a multiple focus controller 170. Note that the system 100B may include more or less elements than these elements.

The first display device 110, the second display device 120, the first input device 115, and the second input device 125 are essentially similar to the respective devices shown in FIG. 1B except that they now have wireless connectivity to IP communication. The user 80_j and 802 use the first and second input devices 115 and 125, respectively, to interact with the multiple focus controller 170. The interactions may include selection of an output display device to be associated with the input device, and generation of key events. The multiple focus controller 170 is essentially the same as the multiple focus controllers 26 and 130 shown in FIGS. 1A and 1B except that it uses a common connection port 175. In addition, it may be connected to the first display device 110, the first input device 115, the second display device 120, and the second input device 125 via a first, second, third, and fourth wireless connections 181, 182, 183, and 184, respectively. These wireless connections have different IP addresses at the same physical connection port 175.

Figure 2A:
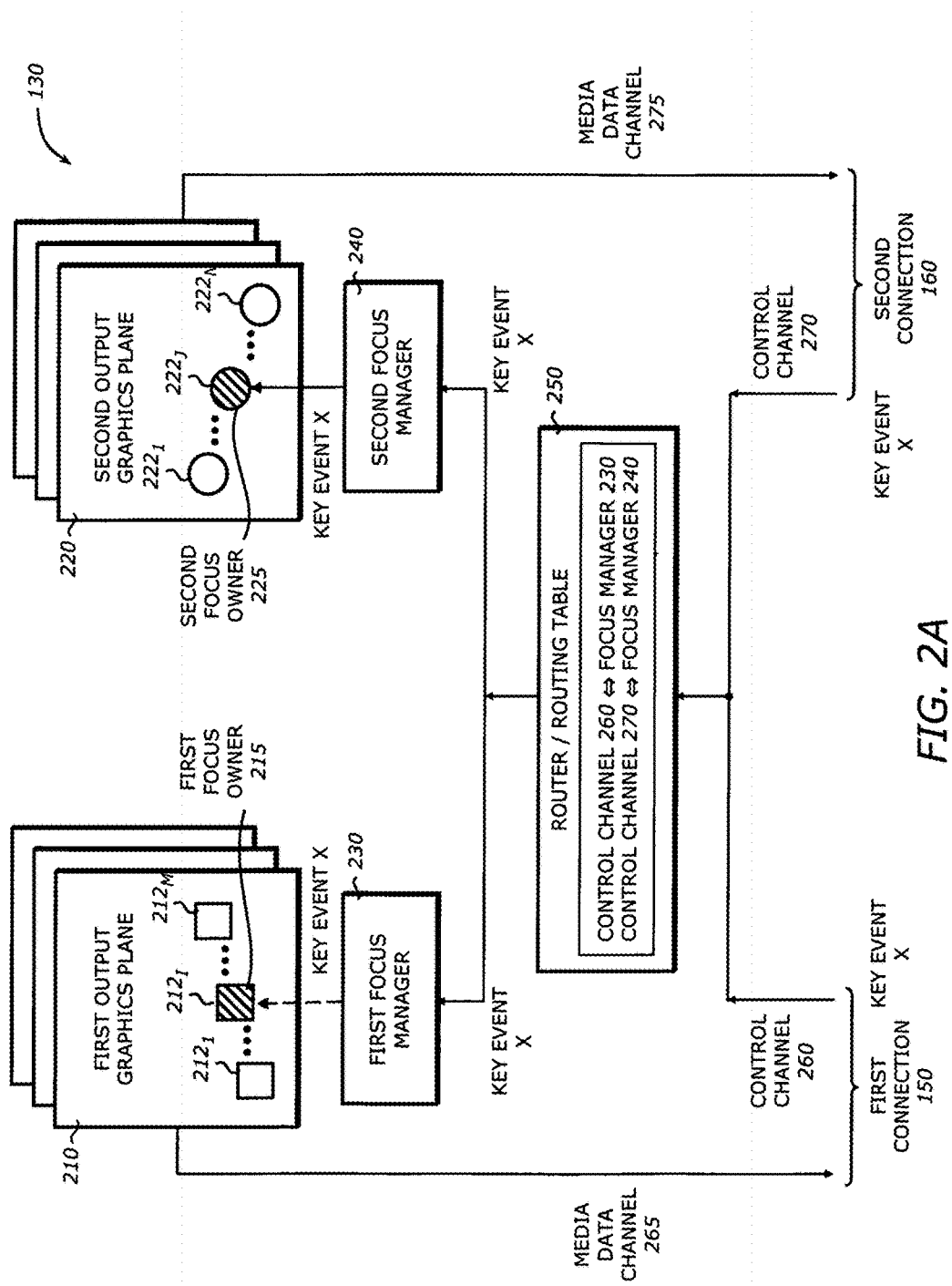
FIG. 2A is a diagram illustrating a multiple focus controller according to one embodiment of the invention.

FIG. 2A is a diagram illustrating the multiple focus controller 130 shown in FIG. 1B according to one embodiment of the invention. The multiple focus controller 130 includes a first output media plane 210, a second output media plane 220, a first focus manager 230, a second focus manager 240, and a router 250. It is noted that other output components are not shown for clarity. These output components may include additional output media planes (e.g., a third output media plane and a fourth output media plane) associated with the first and second focus managers 230 and 240, respectively. A media plane is a plane that contains components or objects that correspond to a displayable entity. It may be a graphics plane, a video plane, or a background plane. The output of the multiple focus controller 130 may not be restricted to a media plane such as the first output media plane 210 and the second output media plane 220. An output may be any combination of any media signal, information, or data such as graphics, video, and background plane. For example, the first output may be built up by mixing the first and second graphics planes, the first video plane, and the first background plane. The second output may be built up by mixing the third and fourth output graphics planes, the second video plane, and the second background plane. In addition, the use of two focus managers 230 and 240 is for illustrative purposes only. More than two focus managers may be included. The number of focus managers may be the same or different than the number of media planes, the number of output display devices, or the number of input devices. In other words, a focus manager may be associated to any number of media planes, output display devices, or input devices.

The first and second output media planes 210 and 220 are associated with the first and second display devices 110 and 120, respectively. They may contain graphical objects or media components that are displayed or played on the corresponding display devices 110 or 120. The first output media plane 210 includes components $212_1$ to $212_M$ associated with a first output focus owner 215. The second output media plane 220 includes components $222_1$ to $222_N$ associated with a second output focus owner 225. The components $212_1$ to $212_M$ and $222_1$ to $222_N$ may correspond to elements of a user interface like a electronic program guide (EPG) composed of menu items, audio segments, icons, etc.

The first and second focus managers 230 and 240 manage the first and second output focus owners 215 and 225, respectively. In general, they are configurable and may be redirected to specific components or output focus owners. They keep track of which of the components $212_1$ to $212_M$ and $222_1$ to $222_N$ has a focus. Upon receiving a key event from an input device, the focus controller or router associates the key event to a corresponding focus manager based on the input connection it originates from and the routing table 250. The first focus manager 230 is mainly responsible for managing the first focus owner 215 over the components $212_1$ to $212_M$ associated with the first display output device and the transitions of focus to another component associated to the same display output device. The first focus manager 230 is also responsible for associating a key event generated by the first input device 115 with the first output focus owner 215. Similarly, the focus manager 240 is mainly responsible for managing the second output focus owner 225 over the components $222_1$ to $222_N$ associated with the second display output device and the transitions of focus to another component associated to the same display output device. The second focus manager 240 is also responsible for associating a key event generated by the second input device 125 to the second output focus owner 225. The first and second output focus owners 215 and 225 are active simultaneously to provide simultaneous interactions with a user or users via the first and second input devices 115 and 125. The components $212_1$ to $212_M$ are typically independent from the components $222_1$ to $222_N$.

The first and second focus managers 230 and 240 associate and/or dispatch key events generated by the corresponding input devices to the focus owner they maintain. They may monitor the consumption of the key event by the focus owner and further dispatch the event to other component and they also manage the transitions of focus from one component to another.

The router/routing table 250 is coupled to the first and second focus managers 230 and 240 to provide association information to allow routing a key event to the appropriate focus manager that is associated with the corresponding input device connection that generates the key event. In other words, the router/routing table 250 helps routing a key event to the first focus manager 230 when that key event is generated by the first input device 115 or 117 originated from the first connection 150 via an association with the first focus manager 230. Similarly, the router/routing table 250 helps routing a key event to the second focus manager 240 when that key event is generated by the second input device 125 and targeted the second focus manager originating from the second connection 160 via an association with the second focus manager 240.

The association between the connection and the focus manager may be temporary or permanent. A temporary association may be setup and kept in software via a mapping or a table look-up operation. The temporary association may be established in a system with wireless IP connections as the system 100B shown in FIG. 1C. A permanent association may be performed by hardware via permanent connection. The permanent association may be established in a system with cable connections as the system 100A shown in FIG. 1B. The HDMI connector creates a natural binding between the input device connection and the display device connections. So in this case it is intuitive to associate the input connection with a focus manager which focus owner component is associated with the output. For a temporary or permanent association, the router/routing table 250 may include a function or a module to set up or reconfigure the mapping to map the connection ports 140 or 145 to the focus managers 230 or 240.

The embodiment shown in FIG. 2A may correspond to the connections shown in FIG. 1B. The first connection 150 may include a control channel 260 and a media data channel 265. The control channel 260 delivers its events to the router/routing table 250 while the media data channel 265 is connected to the first output media plane 210. Similarly, the second connection 160 includes a control channel 270 and a media data channel 275. The control channel 270 delivers its events to the router/routing table 250 and the media data channel 275 is connected to the second output media plane 220. The control channels 260 and 270 transport control data such as the key event or remote control functions, from an input device to the router/routing table 250. The media data channels 265 and 275 transport or carry the media data such as video, audio, content, graphics, etc. from the associated media plane to the corresponding display device. In one embodiment, the first and second connections 150 and 160 are HDMI compliant. The control channels 260 and 270 may be Consumer Electronics Control (CEC) channels and the media data channels 265 and 275 may be Transition Minimized Differential Signaling (TMDS) channels.

When the first and second connections 150 and 160 are cable connections such as the HDMI connections, the routing of the key event is based on Consumer Electronics Control (CEC) channels and the Transition Minimized Differential Signaling (TMDS) channels being physically linked together. For example, the key event X may be generated by the first input device 115. This key event is routed through the router/routing table 250 to a focus manager. The router/routing table 250 contains the information that associates the control channel that transports the key event with the focus manager keeping track of a focus owner component associated to the output display device of the same connection. Since the key events generated by the input devices 115 and 117 are transported through the control channel 250 and the first focus manager 230 points to a focus owner component associated with the media plane transported over the media data channel 265 carried over the same connection, it is natural for the user to associate control channel 260 with focus manager 230 in the routing table.

As described above, the embodiment shown in FIG. 2A corresponds to the wired connections shown in FIG. 1B. When the connections between the input devices and the multiple focus controller 130/170 goes through the same physical connection port, such as in the embodiment shown in FIG. 1C, the routing table discriminates the input connection based on the logical connection to the input device.

In the embodiment shown in the system 100B in FIG. 1C, the key event may be delivered to the router/routing table 250 through the same physical connection port but via different logical connections like internet sockets. The routing of the key event may be based on the internet socket identification. Key events arrive in data packets identified as belonging to a specific connection by its sockets, that is, the combination of protocol (TCP, UDP), source host IP address, source port, destination host IP address, and destination port. The router 250 may perform a mapping of the socket connection to the corresponding focus manager and routes the key event accordingly.

The association table in the router/routing table 250 may be established as follows. First, the input device connects wirelessly to the multiple focus controller and requests a list of the connected display devices. The input device may be SONY PSP's. The multiple focus controller returns the requested list to the input device. Then, the input device prompts the user to select a display device from the list and informs the multiple focus controller of the user's choice. The multiple focus controller then sends wirelessly an output signal (e.g., visual and/or audible signal) through the selected output device recognizable by the user to confirm the selected output device. Upon confirmation, a table is retained in the multiple focus controller that links the input device and the display device. The routing table may be built manually and on the fly. In addition, since the same physical connection port (e.g., connection port 175) is used, the determination of the input device is based on the IP address. For embodiments using other same connection port, other methods to distinguish the input devices may be developed according to the type of connection or the type of input device. The construction of the router or the routing table 250 is explained in detailed in FIG. 2C.

Figure 2B:
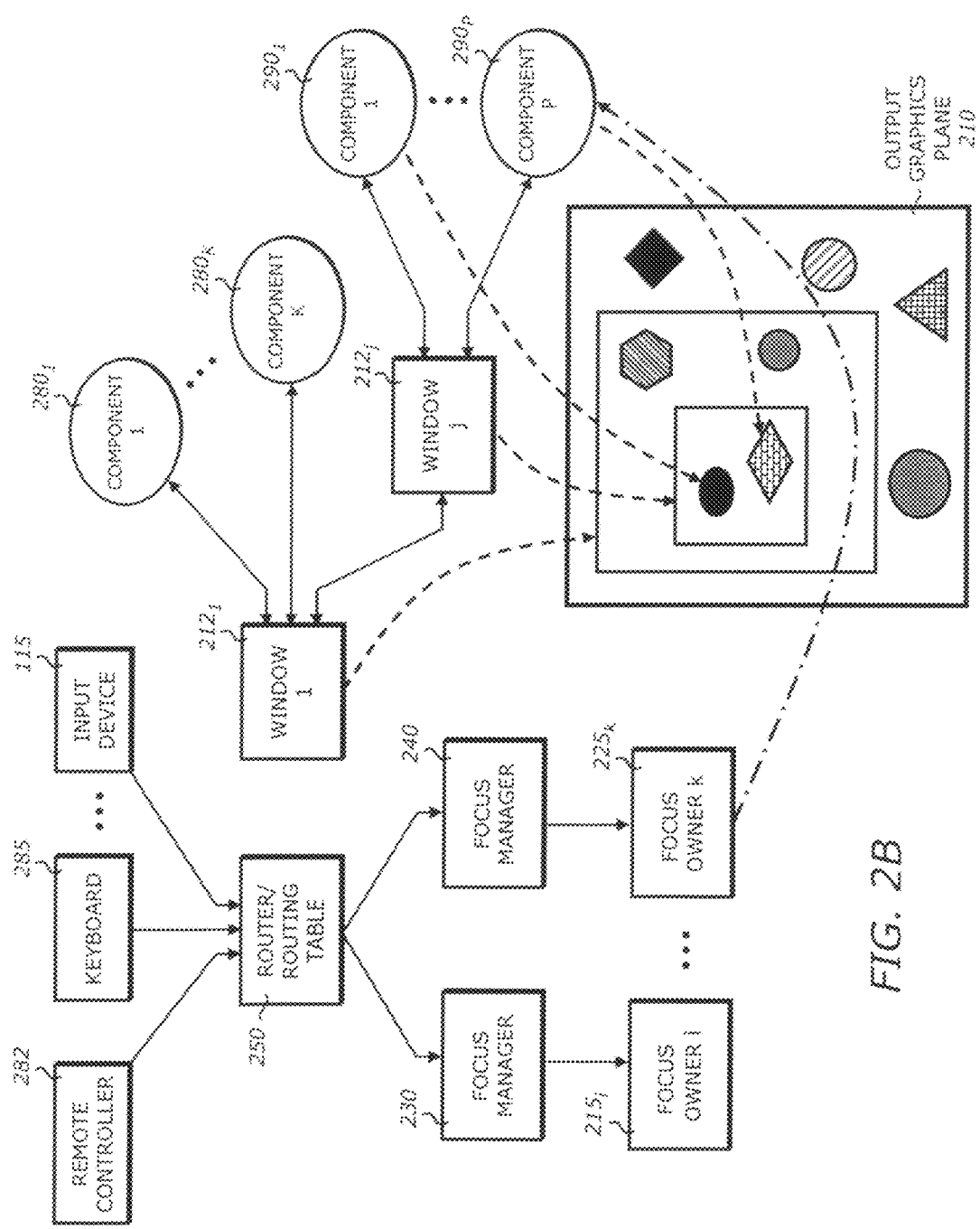
FIG. 2B is a diagram illustrating components on a media plane according to one embodiment of the invention.

FIG. 2B is a diagram illustrating how components on the media plane 210/220 may be hierarchically organized according to one embodiment of the invention. The media plane 210/220 includes components $212_1$ to $212_M$ and $222_1$ to $222_N$ as shown in FIG. 2A.

The focus manager 230/240 may be responsible for managing how the focus owner transfers between the components and may restrict this transfer to components below a common root. It receives a key event from an input device such as a remote controller 282, a keyboard 285, or the input device 115 shown in FIG. 1. The focus manager 230/240 maintains the router/routing table 250. The router/routing table 250 keeps track of the configured associations between the input devices and the focus managers 230/240. This association information is used to dispatch the key event associated with an input device to the corresponding focus owner. At any moment the router/routing table 250 may be configured or changed according to user's input.

At any particular instant, a component being managed by the associated focus manager can become a focus owner (e.g., the focus owners 215 and 225 shown in FIG. 2A). Each of the components $212_1$ to $212_M$ and $222_1$ to $222_N$ may correspond to a display element on the media plane. It may be a window, an icon, a button on a drop-down list, etc. The components may form a tree-like structure where there is a hierarchical structure with multiple levels. A component may contain or spawn another component in a similar manner that a parent node in a tree may spawn one or more child nodes. For example, as shown in FIG. 2B, the component $212_1$ is a first window that contains components $280_1$ to $280_K$ and a second window $212j$. The second window $212j$ contains components $290_1$ to $290_P$. Each of the parent nodes (e.g., a window) maintains a list of the components that it contains.

Each of the components $212_1$, $280_1$ to $280_K$, $212_j$, and $290_1$ to $290_P$ has attributes that enable it to display itself. Not all of the components are focusable. In general, each of them knows whether it is focusable or not. When the focus manager 230/240 passes a key event to a component, the component examines whether it may be responsible for responding to the key event. If it determines that the key event falls within its responsibility, it may generate a corresponding response. Otherwise, the focus manager may pass the key event to a next component in the chain. A key event, therefore, may traverse the tree of the components until it arrives at a responsive component.

Figure 2C:
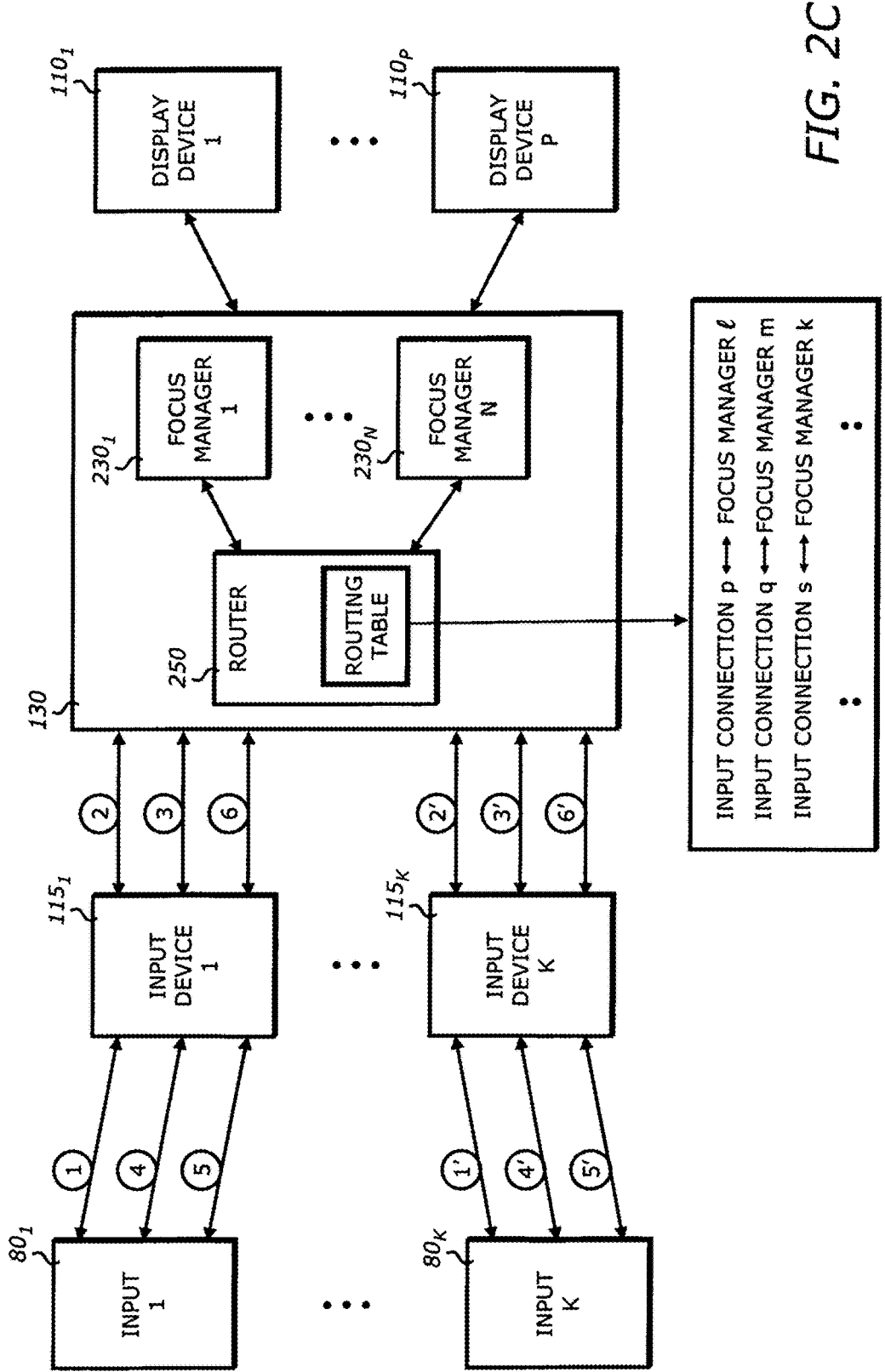
FIG. 2C is a diagram illustrating a process to construct a routing table according to one embodiment of the invention.

FIG. 2C is a diagram illustrating a routing table according to one embodiment of the invention. Its routing table 250 illustrates an embodiment in which more than one input device is associated with the same focus manager. The router/routing table 250 may be updated at any time by a user. It may be configured or updated during a configuration mode by the user. For example a dedicated key on the remote control may also be used to make the remote control appear as another input device and thus be associated with another focus manager. The association between input sources, input devices, or connection ports and the focus managers may be one-to-one, many-to-one, one-to-many, or many-to-many. For example, one input source/device/connection port may be associated with one or more focus managers, or one or more input sources/devices/connection ports may be associated with one focus manager.

The assignment of the communication ports to correspond to the input devices may also be performed during the configuration or update of the router/routing table 250. As described above, for cable connections such as the HDMI interface, the input device port assignment may be based on the physical entry point as configured by the HDMI protocol. For wireless IP connections, the port assignment may be based on the IP address.

Figure 3:
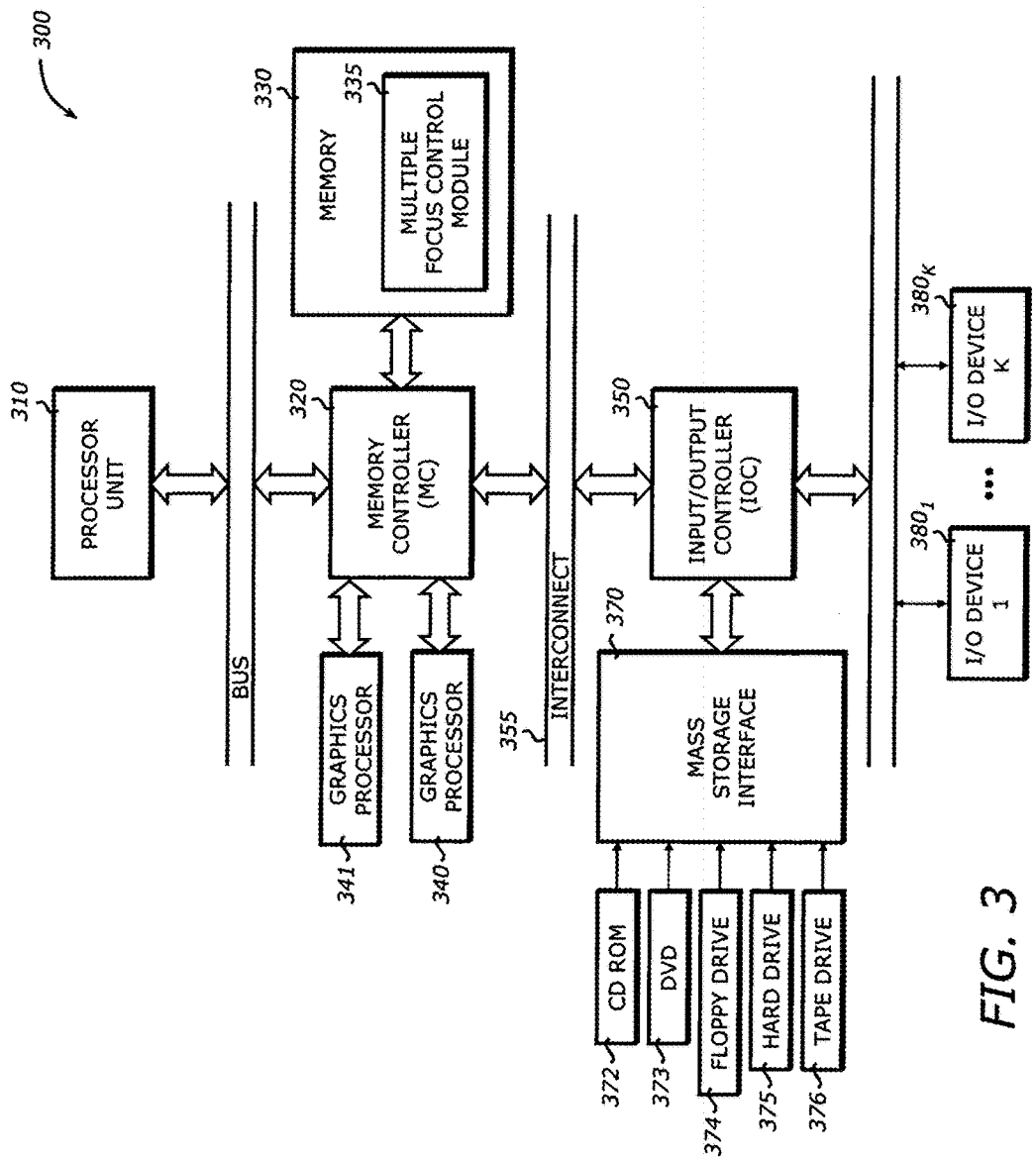
FIG. 3 is a diagram illustrating a processing system implementing the multiple focus controller according to one embodiment of the invention.

FIG. 3 is a diagram illustrating a processing system 300 implementing the multiple focus controller 130 in which one embodiment of the invention can be practiced. It is noted that the multiple focus controller 130 may be implemented by hardware, software, or a combination of both hardware and software. The system 300 includes a processor unit 310, a memory controller (MC) 320, a memory 330, first and second graphics processors 340 and 341, an input/output controller (IOC) 350, an interconnect 355, a mass storage interface 370, and input/output (I/O) devices $380_1$ to $380_K$.

The processor unit 310 represents a central processing unit of any type of architecture, such as processors using hyper threading, security, network, digital media technologies, single-core processors, multi-core processors, embedded processors, mobile processors, micro-controllers, digital signal processors, superscalar computers, vector processors, single instruction multiple data (SIMD) computers, complex instruction set computers (CISC), reduced instruction set computers (RISC), very long instruction word (VLIW), or hybrid architecture.

The MC 320 provides control and configuration of memory and input/output devices such as the memory 330 and the IOC 350. The MC 320 may be integrated into a chipset that integrates multiple functionalities such as graphics, media, isolated execution mode, host-to-peripheral bus interface, memory control, power management, etc. The MC 320 or the memory controller functionality in the MC 320 may be integrated in the processor unit 310. In some embodiments, the memory controller, either internal or external to the processor unit 310, may work for all cores or processors in the processor unit 310. In other embodiments, it may include different portions that may work separately for different cores or processors in the processor unit 310.

The main memory 330 stores system code and data. The main memory 330 is typically implemented with dynamic random access memory (DRAM), static random access memory (SRAM), or any other types of memories including those that do not need to be refreshed. The main memory 330 may include multiple channels of memory devices such as DRAMs. The main memory 330 may include a multiple focus control module 335. The multiple focus control module 335 includes program instructions and data to perform multiple focus control functions. The multiple focus control module 335 may be implemented in a JAVA Virtual Machine (JVM) that maintains multiple focus managers corresponding to multiple input devices.

The first and second graphics processors 340 and 341 may be any processors that provide graphics functionalities. Each of them may also be integrated into the MC 320 to form a Graphics and Memory Controller (GMC). Each of them may be a graphics card such as the Graphics Performance Accelerator (AGP) card, interfaced to the MC 320 via a graphics port such as the Accelerated Graphics Port (AGP) or a peripheral component interconnect (PCI) Express interconnect. Each of them provides interface to an external display device such as standard progressive scan monitor, television (TV)-out device, and Transition Minimized Differential Signaling (TMDS) controller.

The IOC 350 has a number of functionalities that are designed to support I/O functions. The IOC 350 may also be integrated into a chipset together or separate from the MC 320 to perform I/O functions. The IOC 350 may include a number of interface and I/O functions such as peripheral component interconnect (PCI) bus interface, processor interface, interrupt controller, direct memory access (DMA) controller, power management logic, timer, system management bus (SMBus), universal serial bus (USB) interface, mass storage interface, low pin count (LPC) interface, wireless interconnect, direct media interface (DMI), etc.

The interconnect 355 provides interface to peripheral devices. The interconnect 355 may be point-to-point or connected to multiple devices. For clarity, not all interconnects are shown. It is contemplated that the interconnect 355 may include any interconnect or bus such as Peripheral Component Interconnect (PCI), PCI Express, Universal Serial Bus (USB), Small Computer System Interface (SCSI), serial SCSI, and Direct Media Interface (DMI), etc.

The mass storage interface 370 interfaces to mass storage devices to store archive information such as code, programs, files, data, and applications. The mass storage interface may include SCSI, serial SCSI, Advanced Technology Attachment (ATA) (parallel and/or serial), Integrated Drive Electronics (IDE), enhanced IDE, ATA Packet Interface (AT-API), etc. The mass storage device may include compact disk (CD) read-only memory (ROM) 372, digital versatile disc (DVD) 373, floppy drive 374, hard drive 375, tape drive 376, and any other magnetic or optic storage devices. The mass storage device provides a mechanism to read machine-accessible media.

The I/O devices $380_1$ to $380_K$ may include any I/O devices to perform I/O functions. Examples of I/O devices $380_1$ to $380_K$ include controller for input devices (e.g., keyboard, mouse, trackball, pointing device), media card (e.g., audio, video, graphic), network card, and any other peripheral controllers. The I/O devices $380_1$ to $380_K$ may provide the connection parts (e.g., connection ports 140 and 145 shown in FIG. 1) with interface to the connections 150 and 160 such as the HDMI interface or the Internet interface.

Elements of one embodiment of the invention may be implemented by hardware, firmware, software or any combination thereof. The term hardware generally refers to an element having a physical structure such as electronic, electromagnetic, optical, electro-optical, mechanical, electro-mechanical parts, etc. A hardware implementation may include circuits, devices, processors, applications specific integrated circuits (ASICs), programmable logic devices (PLDs), field programmable gate arrays (FPGAs), or any electronic devices. The term software generally refers to a logical structure, a method, a procedure, a program, a routine, a process, an algorithm, a formula, a function, an expression, etc. The term firmware generally refers to a logical structure, a method, a procedure, a program, a routine, a process, an algorithm, a formula, a function, an expression, etc., that is implemented or embodied in a hardware structure (e.g., flash memory, ROM, EPROM). Examples of firmware may include microcode, writable control store, micro-programmed structure. When implemented in software or firmware, the elements of an embodiment of the present invention are essentially the code segments to perform the necessary tasks. The software/firmware may include the actual code to carry out the operations described in one embodiment of the invention, or code that emulates or simulates the operations. The program or code segments can be stored in a processor or machine accessible medium or transmitted by a computer data signal embodied in a carrier wave, or a signal modulated by a carrier, over a transmission medium. The "processor readable or accessible medium" or "machine readable or accessible medium" may include any medium that can store, transmit, or transfer information. Examples of the processor readable or machine accessible medium include a storage medium, an electronic circuit, a semiconductor memory device, a read only memory (ROM), a flash memory, an erasable programmable ROM (EPROM), a floppy diskette, a compact disk (CD) ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, Intranet, etc. The machine accessible medium may be embodied in an article of manufacture. The machine accessible medium may include information or data that, when accessed by a machine, cause the machine to perform the operations or actions described above. The machine accessible medium may also include program code embedded therein. The program code may include machine readable code to perform the operations or actions described above. The term "information" or "data" here refers to any type of information that is encoded for machine-readable purposes. Therefore, it may include program, code, data, file, etc.

All or part of an embodiment of the invention may be implemented by various means depending on applications according to particular features, functions. These means may include hardware, software, or firmware, or any combination thereof. A hardware module is coupled to another module by mechanical, electrical, optical, electromagnetic or any physical connections. A software module is coupled to another module by a function, procedure, method, subprogram, or subroutine call, a jump, a link, a parameter, variable, and argument passing, a function return, etc. A software module is coupled to another module to receive variables, parameters, arguments, pointers, etc. and/or to generate or pass results, updated variables, pointers, etc. A firmware module is coupled to another module by any combination of hardware and software coupling methods above. A hardware, software, or firmware module may be coupled to any one of another hardware, software, or firmware module. A module may also be a software driver or interface to interact with the operating system running on the platform. A module may also be a hardware driver to configure, set up, initialize, send and receive data to and from a hardware device. An apparatus may include any combination of hardware, software, and firmware modules.

While the invention has been described in terms of several embodiments, those of ordinary skill in the art will recognize that the invention is not limited to the embodiments described, but can be practiced with modification and alteration within the spirit and scope of the appended claims. The description is thus to be regarded as illustrative instead of limiting.

What is claimed is:

1. An apparatus comprising:
   first and second focus managers to manage first and second focus owners, respectively, the first and second focus owners corresponding to components of media planes displayable on at least one of a plurality of output display devices, the first and second focus managers associating first and second key events generated by first and second input devices, respectively, to the respective first and second focus owners, wherein the first and second focus managers restrict transfers based on the components of media planes having a common root in a hierarchical structure; and
   a hardware router coupled to the first and second focus managers, the router having a routing table that stores information of association (i) between a first connection and the first focus manager and (ii) between a second connection and the second focus manager, the router routing one of the first and second key events originating from the first and second connections, respectively, to a corresponding focus manager using the information of association stored in the routing table, wherein the first and second key events are delivered to the routing table through a same physical connection port but via different logical connections, wherein routing one of the first and second key events is based on Internet socket identification, wherein the media planes are distributed between a first output and a second output, wherein the first output comprises a first plurality of graphics planes, a first video plane and a first background plane, and the second output comprises a second plurality of graphics planes, a second video plane and a second background plane.

2. The apparatus of claim 1 wherein the association is temporary or permanent.

3. The apparatus of claim 1 wherein the association is based on a physical entry point of one of the first and second key events.

4. The apparatus of claim 1 wherein the information includes a mapping between first and second connection ports and the first and second focus managers, respectively.

5. The apparatus of claim 4 wherein one of the first and second focus managers dispatches the respective key event generated by a corresponding input device to the corresponding focus owner based on the information, the respective key event being received at the associated connection port.

6. The apparatus of claim 5 wherein the first and second connection ports are compatible with High Definition Multimedia Interface (HDMI).

7. The apparatus of claim 6 wherein each of the first and second connection ports comprises:
   a Consumer Electronics Control (CEC) channel connected to the router to transport remote control functions; and
   a Transition Minimized Differential Signaling (TMDS) channel connected to an output graphics plane of corresponding output focus owner to transport media data.

8. The apparatus of claim 5 wherein the first and second connection ports correspond to first and second Internet Protocol (IP) ports of an IP connection.

9. The apparatus of claim 1 wherein one of the first and second managers dispatches respective key event to the respective focus owner.

10. The apparatus of claim 1 wherein the first and second focus owners are active simultaneously.

11. The apparatus of claim 1 wherein the association is one-to-one, one-to-many, many-to-one, or many-to-many.

12. A method comprising:
    managing first and second focus owners by first and second focus managers, respectively, the first and second focus owners corresponding to components of media planes displayable on at least one of a plurality of output display devices, the first and second focus managers associating first and second key events generated by first and second input devices, respectively, to the respective first and second focus owners, wherein the first and second focus managers restrict transfers based on the components of media planes having a common root in a hierarchical structure; and
    routing one of the first and second key events to a corresponding focus manager using information of association (i) between a first connection and the first focus manager and (ii) between a second connection and the second focus manager, the information of association being stored in a routing table, wherein the first key event originates from the first connection and the second key event originates from the second connection, wherein the first and second key events are delivered to the routing table through a same physical connection port but via different logical connections, wherein routing one of the first and second key events is based on Internet socket identification, wherein the media planes are distributed between a first output and a second output, wherein the first output comprises a first plurality of graphics planes, a first video plane and a first background plane, and the second output comprises a second plurality of graphics planes, a second video plane and a second background plane.

13. The method of claim 12 wherein the association is temporary or permanent.

14. The method of claim 12 wherein the association is based on a physical entry point of one of the first and second key events.

15. The method of claim 12 wherein the information includes a mapping between first and second connection ports and the first and second focus managers, respectively.

16. The method of claim 15 wherein managing comprises dispatching the respective key event generated by a corresponding input device to the corresponding focus owner based on the information, the respective key event being received at the associated connection port.

17. The method of claim 16 wherein the first and second connection ports are compatible with High Definition Multimedia Interface (HDMI).

18. The method of claim 17 wherein managing comprises:
transporting remote control functions via a Consumer Electronics Control (CEC) channel connected to the router; and
transporting media data via a Transition Minimized Differential Signaling (TMDS) channel connected to an output graphics plane of corresponding output focus owner.

19. The method of claim 16 wherein the first and second connection ports correspond to first and second Internet Protocol (IP) ports of an IP connection.

20. The method of claim 12 wherein managing comprises dispatching one of the first and second key events to the respective focus owner.

21. The method of claim 12 wherein the first and second output focus owners are active simultaneously.

22. The method of claim 12 wherein the association is one-to-one, one-to-many, many-to-one, or many-to-many.

23. A system comprising:
first and second display devices to display media data;
first and second input devices to generate first and second key events, respectively; and
a multiple focus controller coupled to a plurality of output display devices, the multiple focus controller comprising:
first and second focus managers to manage first and second focus owners, respectively, the first and second focus owners corresponding to components of media planes displayable on at least one of the first and second display devices, the first and second focus managers associating the first and second key events to the respective first and second focus owners, and
a router coupled to the first and second focus managers, the router having a routing table that stores information of association (i) between a first connection and the first focus manager and (ii) between a second connection and the second focus manager, the router routing one of the first and second key events originating from the first and second connections, respectively, to a corresponding focus manager using the information of association stored in the routing table, wherein the first and second key events are delivered to the routing table through a same physical connection port but via different logical connections, wherein routing one of the first and second key events is based on Internet socket identification, wherein the media planes are distributed between a first output and a second output, wherein the first output comprises a first plurality of graphics planes, a first video plane and a first background plane, and the second output comprises a second plurality of graphics planes, a second video plane and a second background plane, wherein the first and second focus managers restrict transfers based on the components of media planes having a common root in a hierarchical structure.

24. The system of claim 23 wherein the association is temporary or permanent.

25. The system of claim 23 wherein the association is based on a physical entry point of one of the first and second the key events.

26. The system of claim 23 wherein the information includes a mapping between first and second connection ports and the first and second focus managers, respectively.

27. The system of claim 23 wherein one of the first and second focus managers dispatches respective key event to the respective focus owner.

28. The system of claim 23 wherein the association is one-to-one, one-to-many, many-to-one, or many-to-many.

29. An article of manufacture comprising:
a machine-accessible non-transitory medium including data that, when accessed by a machine, causes the machine to perform operations comprising:
managing first and second focus owners by first and second focus managers, respectively, the first and second focus owners corresponding to components of media planes displayable on at least one of a plurality of output display devices, the first and second focus managers associating first and second key events generated by first and second input devices, respectively, to the respective first and second focus owners; and
routing one of the first and second key events to a corresponding focus manager using information of association (i) between a first connection and the first focus manager and (ii) between a second connection and the second focus manager, the information of association being stored in a routing table, wherein the first key event originates from the first connection and the second key event originates from the second connection, wherein the first and second key events are delivered to the routing table through a same physical connection port but via different logical connections, wherein routing one of the first and second key events is based on Internet socket identification, wherein the media planes are distributed between a first output and a second output, wherein the first output comprises a first plurality of graphics planes, a first video plane and a first background plane, and the second output comprises a second plurality of graphics planes, a second video plane and a second background plane, wherein the first and second focus managers restrict transfers based on the components of media planes having a common root in a hierarchical structure.

30. The article of manufacture of claim 29 wherein the association is temporary or permanent.

31. The article of manufacture of claim 29 wherein the association is based on a physical entry point of one of the first and second key events.

32. The article of manufacture of claim 29 wherein the information includes a mapping between first and second connection ports and the first and second focus managers, respectively.

33. The article of manufacture of claim 29 wherein the data causing the machine to perform managing comprise data that, when accessed by a machine, causes the machine to perform operations comprising:
   dispatching one of the first and second key events to the respective focus owner.

* * * * *